United States Patent [19]

Cohen et al.

[11] 3,862,373

[45] Jan. 21, 1975

[54] ADAPTIVE SAMPLING RATE TIME DIVISION MULTIPLEXER AND METHOD

[75] Inventors: Peter J. Cohen, Stony Brook; Phillip W. Ackerman, Smithtown, both of N.Y.

[73] Assignee: Databit Incorporated, Haupauge, N.Y.

[22] Filed: Nov. 21, 1973

[21] Appl. No.: 418,029

Related U.S. Application Data

[63] Continuation of Ser. No. 215,816, Jan. 6, 1972, abandoned.

[52] U.S. Cl. .......................... 179/15 BV, 179/15 AF

[51] Int. Cl. .............................................. H04j 3/16

[58] Field of Search ....... 179/15 BV, 15 BA, 15 AF; 178/50

[56] References Cited

UNITED STATES PATENTS

| | | | |
|---|---|---|---|
| 3,261,001 | 7/1966 | Magnin | 178/50 |
| 3,311,886 | 3/1967 | Herman | 179/15 BA |
| 3,504,287 | 3/1970 | Deregnaucourt | 179/15 AF |
| 3,534,264 | 10/1970 | Blasbale | 179/15 BV |
| 3,535,450 | 10/1970 | Vollmeyer | 178/50 |
| 3,575,557 | 4/1971 | McCowen | 179/15 AF |
| 3,663,760 | 5/1972 | DeWitt | 179/15 AF |
| 3,749,841 | 7/1973 | Cohen et al. | 179/15 BV |
| 3,752,933 | 8/1973 | Cohen et al. | 179/15 BV |

OTHER PUBLICATIONS

Transmission Systems for Communications, Bell Telephone Laboratories, February 1970, pp. 553–565 and 610–611.

*Primary Examiner*—David L. Stewart
*Attorney, Agent, or Firm*—Toren and McGeady

[57] ABSTRACT

The disclosed multiplexer responds to data appearing on separate channels at different signalling speeds or bit rates. At least two sampling rates are selected. One of the sampling rates is a base rate equal to or higher than the lowest signalling speed and the other sampling rate is a multiple of the base rate equal to or higher than the fastest signalling speed. The lowest speed signals are sampled at the base rate and the higher speed signals with the higher rate. The resulting sampled data is then interleaved. The lowest bit rate occupies the normal number of slots and the higher bit rate occupies a multiple number of the low rate slots. The interleaved signals are then transmitted. To accommodate telex call-establishing signals, which may occur in the same channel at rates different from the data rate, the existance of such call-establishing signals is determined and the sampling times are adjusted. The sampled signals are regenerated into bits which are multiples of the data rate. These bits are interleaved as data. Within the multiplexer distortion is removed by regenerating the signals in each channel on the basis of the condition of the center of each bit. This is comparable to a repeater. The bit center is located by high speed sampling techniques which count to the center of each bit on the basis of predetermined programs which are preset in accordance with the expected bit rate in each channel.

2 Claims, 42 Drawing Figures

ADAPTIVE SAMPLING RATE TIME DIVISION MULTIPLEXER AND METHOD

This is a continuatin of application Ser. No. 215,816, filed Jan. 6, 1972, now abandoned.

BACKGROUND OF THE INVENTION

This invention relates to methods and means for time division multiplexing, particularly for multiplexing data arriving at varying bit rates, and for processing Telex signalization through the multiplexer.

A multiplexer can be defined as a communications device that accepts information from many independent sources and transfers all of this information simultaneously over a single wire or transmission medium for long distances. Demultiplexing then restores the data to its original form and distributes it to independent receiving devices. The utilization of multiplexing techniques is obviously an economical approach to data transmission since each transmission line or link can in this way be utilized to greater capacity.

There are two main techniques utilized for multiplexing: frequency division multiplexing (FDM) and time division multiplexing (TDM). Frequency division multiplexing is accomplished by converting each data source into a unique pair of audio frequencies, which are then combined on a common transmission line. At the receiving end each pair of frequencies is detected and converted back into the original binary form. Time division multiplexing on the other hand is accomplished by sequentially sampling the state of each incoming line. These high speed samples are combined with framing information into a single binary stream. This stream is then converted into audio tones by a high speed modem and transmitted over the same media that the FDM tones were transmitted over. The receive end then merely reverses the process.

Time division multiplexing inherently utilizes the standard VF channel more efficiently than does frequency division multiplexing. A voice channel typically carrying 16–24 channels of FDM can carry 40–92 channels utilizing TDM.

Operationally a time division multiplexer can be compared to a rotary switch operation. As the rotary switch contacts each position, that channel's information is passed over a common buss to the receiver equivalent of the rotary switch. In order that all information be transferred properly the rotary switch must rotate fast enough to return to the first position in time to monitor each change of state of the incoming line.

There are two interleaving methods commonly utilized in time division multiplex systems. The character interleave method results in the rotary switch allowing an entire character to pass before moving to the next position. This provides signal delays of up to two character intervals, or 300 ms. This delay is not tolerable for applications commercially known by the trademark TELEX, therefore, the bit interleave method is used within a multiplexer when transmission delay is critical. Since the rotary switch samples a bit from each channel per rotation, only about two bits of delay is encountered in a bit interleave system, thus eliminating the danger of call disconnection in Telex applications.

Time division multiplexing systems operate efficiently as long as the signalling speed or bit rate in the different channels is the same. However, problems arise when many speeds are to be handled simultaneously. Present time division multiplexers interleave higher bit rates with lower bit rates by sampling all channels at a rate suitable for the highest rate. However, this drastically reduces the total number of channels which can be combined. This is so because the sampling is accmplished at a given aggregate speed, with a given number of sampling pulses per unit time. If each channel utilizes the higher rate of sampling, that is, it utilizes more of the aggregate pulses in each time unit, fewer channels can be accommodated. Another way of putting this is to say that if each channel rate is higher it occupies a larger portion of the fixed aggregate band width and allows for fewer channels.

Moreover, present time division multiplexing systems cannot cope efficiently with usual Telex call-establishing signals which differ in rate and time from the usual data signals on the same channel. This has been accomplished in the past by cumbersome systems which were comparatively inaccurate.

In general, for multiplexing, it is desirable to regenerate each of the signals in a manner comparable to a repeater. This is so because signals will ordinarily be somewhat distorted in transmission. Frequency division multiplexers do not regenerate and, in fact add distortion to data signals. This distortion is cumulative and can ultimately result in bit errors. Time division multiplexers inherently regenerate the data by sampling at the midpoint of each bit and transmitting its state at that instant.

Despite all these disadvantages modern communication systems often require handling of several signalling speeds. It is also desirable to transmit telex signals. For this reason frequency division multiplex systems are frequently used where time division apparatusses would be more efficient.

An object of this invention is to improve time division multiplexing systems.

Another object of this invention is to overcome the beforementioned disadvantages.

SUMMARY OF THE INVENTION

According to a feature of the invention the aforementioned disadvantages are obviated and the objects attained, by selecting at least two sampling rates, of which one is a base rate and the other a multiple of the base rate, wherein the base rate is equal to or higher than the lowest signalling speed and the other sampling rate is equal to or higher than the faster signalling speed, and sampling the lowest speed signals with the base rate and the higher speed signals with the higher rate, and thereafter interleaving all resulting data. By virtue of this feature, the reduction in channel capacity is limited to the extra channels occupied by the multiple rates associated with the higher signalling speeds. The base rate associated with the lowest signalling speed occupies virtually only the usual number of channels. Thus, for example, a system capable of handling 44,50 baud channels can handle 42,50 baud channels and one 75 baud channel. On the other hand present systems would reduce their capacity to 27,50 baud channels and one 75 baud channel.

According to another feature of the invention, the existance of Telex call-establishing signals is determined and sampling times are adjusted to such call-establishing signals. The sampled signals are regenerated into bits which are multiples of the data rate. These bits are interleaved as data.

According to yet another feature of the invention, the data signals are regenerated regardless of their rate. High-speed sampling means obtain multiple samples of each bit in each channel at the same rate and apply these bits to separate counters. Each counter is preset to count only up to the center of the bits in each channel. The center sample is then used to regenerate each of the bits before transmitting them.

According to another feature of the invention, one counter for each channel counts the number of bits to establish the beginning and end of each character. This is programmed for each channel in a given class of traffic.

DESCRIPTION OF PREFERRED EMBODIMENTS

Figure 1:
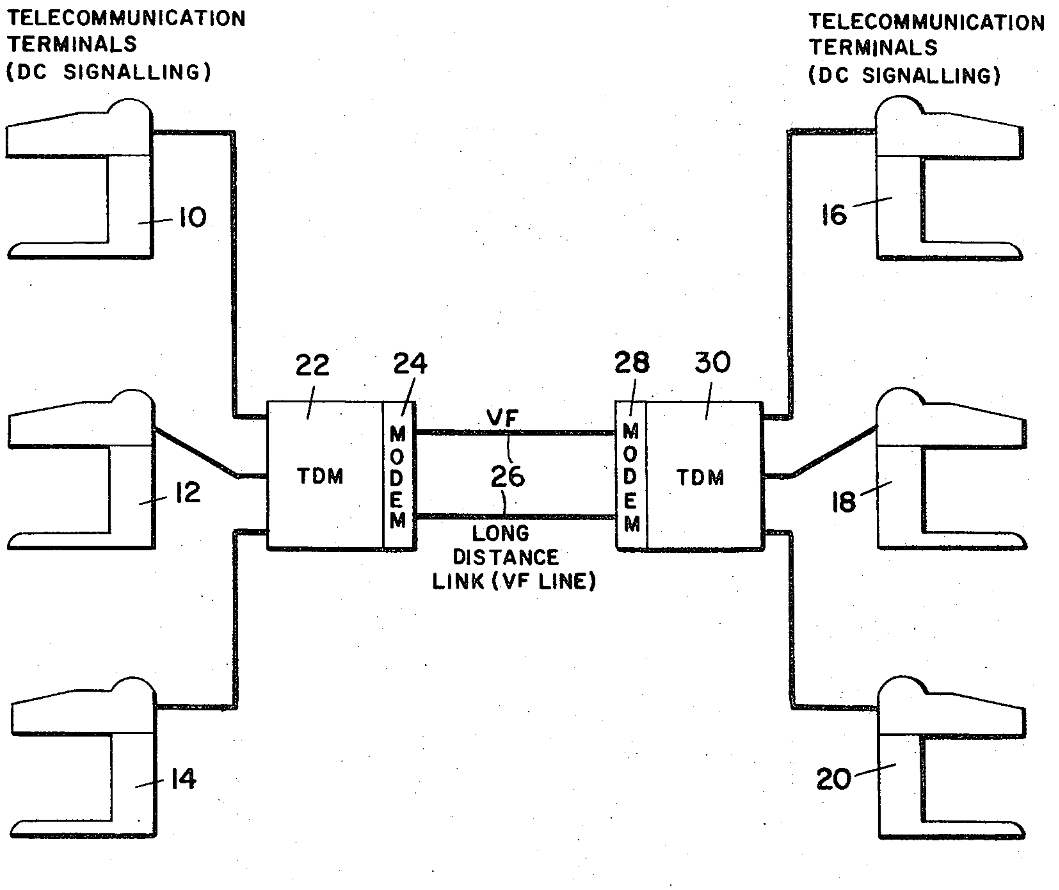
FIG. 1 is a block diagram of a communication system linking three terminals with three other terminals over a common line and embodying features of the invention.

In the communications system of FIG. 1, three telecommunications terminals 10,12 and 14 on one end of the system communicate with three telecommunications terminals 16, 18 and 20 at the other end. Although three terminals are illustrated, these represent any number of terminals, such as 44, which may be employed at each end. Each terminal 10, 12 and 14 furnishes DC data to a time division multiplexer (TDM) 22. The multiplexer 22 samples each input, combines the data by interleaving the three channels, and passes the combined information in a low level DC format to a modem 24. The modem converts the DC aggregate information to audio signals and passes the data over a voice frequency link 26.

A second modem 28 at the receive end converts the audio information back to low level DC and passes it to a second time division multiplexer 30. The latter breaks out each channel's data and delivers it to the terminals 16, 18 and 20.

In return, the terminals 16, 18, and 20 when they send data, deliver DC signals to the multiplexer 30, which multiplexes them and applies the combination to the modem 28 in the form of audio signals. The modem 24 responds by passing the signals to the multiplexer 22 which demultiplexes the signals and distributes them to the terminals 10, 12 and 14.

According to one embodiment of the invention, 2,400 baud modems are utilized for the high speed aggregate.

Figure 2:
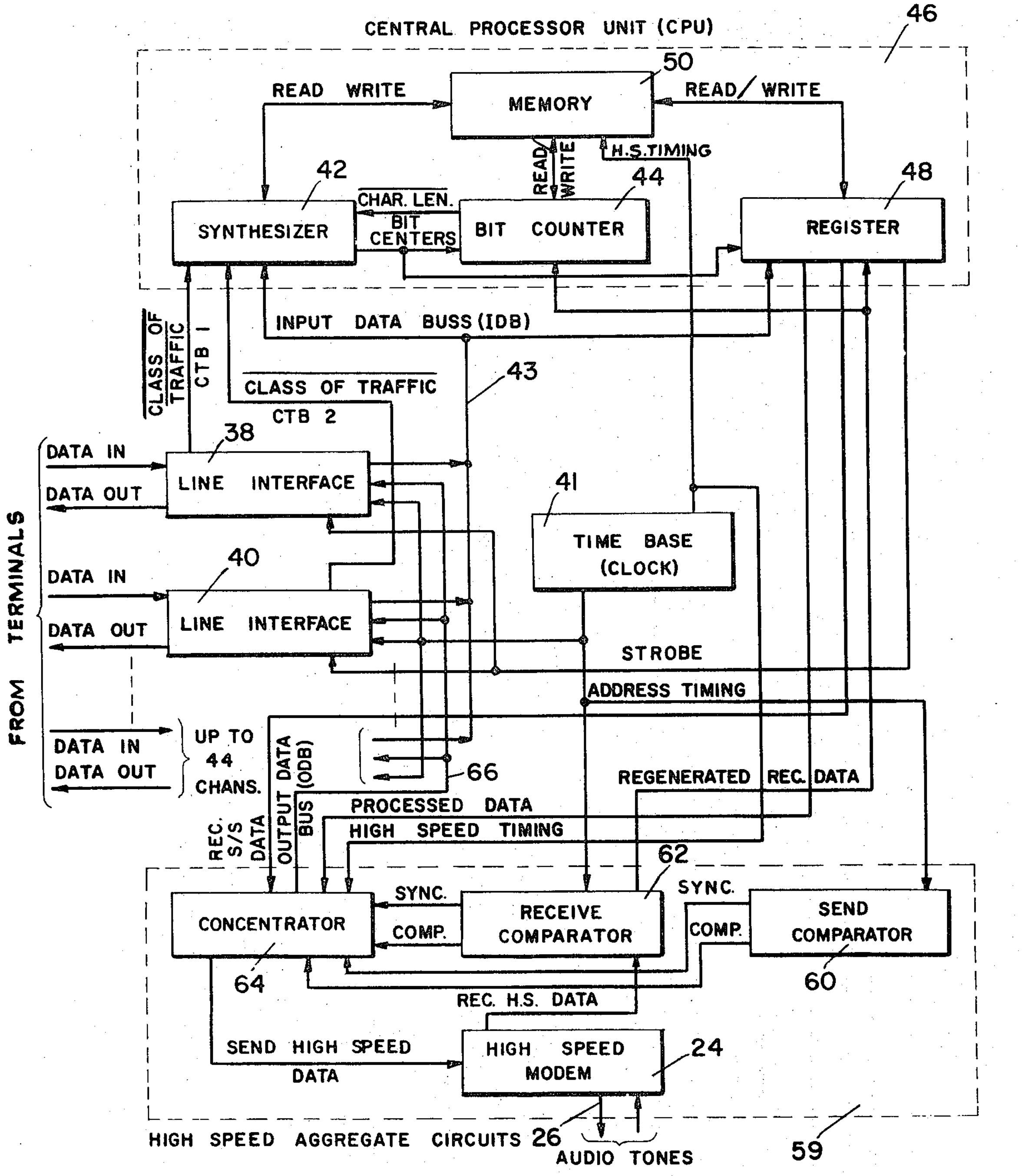
FIG. 2 is a block diagram of a time division multiplexer used in the system of FIG. 1 and embodying features of the invention.
Figure 3:
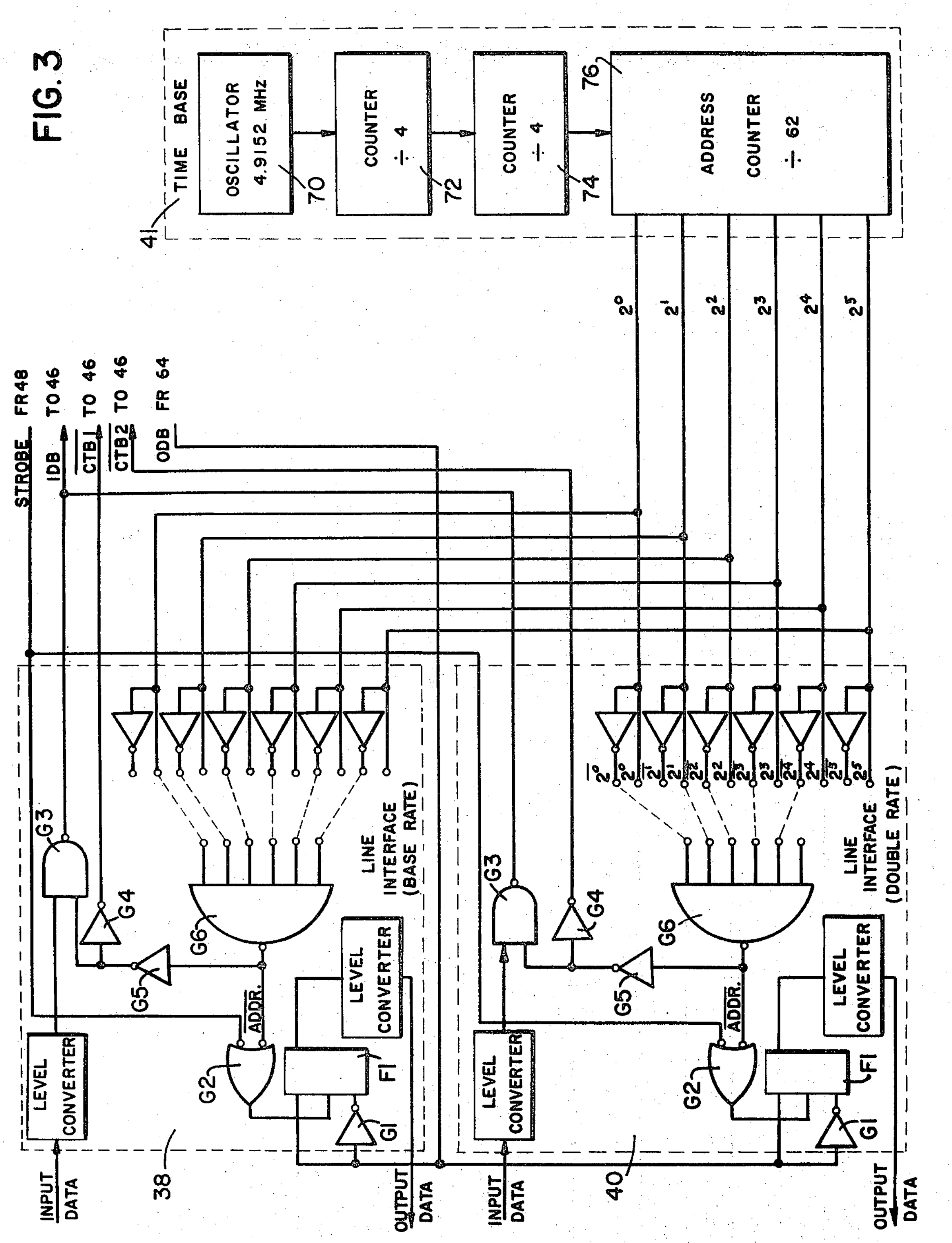
FIG. 3 is a partially logic and partially block diagram illustrating details of a portion of the multiplexer in FIGS. 1 and 2, and including the time base and the interfaces of FIG. 2.

FIG. 2 is a detailed block diagram of one of the time division multiplexers 22 or 30. Here, low speed data enters one interface for each channel. Two such interfaces, 38 and 40, are explicitly shown and the remainder indicated diagrammatically. Any number of such channels and interfaces, up to 44, may exist. Each interface simultaneously receives the same binary coded timing pulses, which cycle every 202 microseconds, from a time base or clock 41. Each interface is programmed to use these pulses to select a different one of 62 time slots for its channel. Each samples the data during the selected time slot. The interfaces also convert the signal levels of the data to a 5 volt neutral positive logic level. For each channel, a time slot and sample thus occur every 202 microseconds. (The time slot for each channel in the 202 microseconds defines the channels "address"). The number of samples per bit, depends on the bit rate and length. As an example, the interface 38 receives data at a rate of 50 bits per second, while the interface 40 at a rate of 75 bits per second. At the rate of 50 bits per second the interface 38 receives bits 20 milliseconds long and the interface 40 receives bits 13 milliseconds long. Thus, each 20 milisecond (20,000 microsecond) bit in interface 38, which is sampled once every 202 microseconds, is sampled approximately 99 times. Each 13 milisecond bit in interface 40 is sampled 68 times.

The sampled bits are assembled on an input data bus 43 and applied to a synthesizer 42. The latter is programmed to respond to the start of each bit at each channel's address and to count 49 time slots for the channel at interface 38 and 34 time slots for the channel at interface 40. In effect the synthesizer finds the center sample of each bit for each address. At the 49th time slot for a given bit associated with the interface 38 (50 baud) the synthesizer 42 generates a bit center pulse corresponding to the theoretical center of the bit. At the 34th time slot for a given bit associated with the interface 40 (75 baud) the synthesizer generates a bit center pulse corresponding to the theoretical center of the bit.

The synthesizer 42 forms part of a central processer unit (CPU) 46. Within the central processer unit 46 a register 48 is gated by the bit center pulses to sample the center of each incoming data bit and regenerate the bit in the manner of a repeater. The register 48 then stores the regenerated signals in a memory 50 for the length of the low speed bit. Within the memory 50 the bit is sampled at its center, using the bit center pulse from the synthesizer 42, and returned to the register 48 before the next bit is entered into the memory. At this point the sampled bit is 0.8 microseconds long and located within a 3.2 microsecond slot. The register places the bit within the aggregate stream. That is the register 48 interleaves each bit within the stream.

The register 48 performs this function for each channel. In effect, it places the bits of all channels in respective locations within the memory 50 and draws them out at predetermined time slots in sequence.

The interleaved bits in the aggregate stream form what is called "processed data" which is fed to a concentrator 64.

Each line interface produces a so-called "class of traffic" signal which indicates the bit rate and the character length. The synthesizer utilizes this information in determining the bit centers.

The concentrator 64 forms part of the high speed or aggregate part 59 of the multiplexer. Also included in the aggregate part are a send comparator 60 and a receive comparator 62. The comparators 60 and 62 work in conjunction with the concentrator 64 to assemble the data into a series of frames. A frame is composed of one bit from each low speed channel plus one bit for frame synchronization. Thus, in effect the high speed part of the multiplexer simply adds a framing pulse to synchronize all of the bits from the different channels. See FIG. 38.

The send comparator 60 operates by sequentially strobing the data that has entered the concentrator 64 from the register 48, and combining it with a sync pattern. This data is then passed in binary DC form to the high speed modem 24 for transmission over the voice frequency circuit 26.

The receive portion of the multiplexer 22 operates conversely to the send side. The high speed aggregate routes to the receive comparator 62 where it is regenerated. The receive comparator 62 then extracts one bit for each channel and conversion back to low speed data is accomplished by the register 48, the bit counter 44 and the synthesizer 42. Output data is then placed on the output data bus 66. The line interfaces 38 and 40 then sample the output data bus 66 when its address occurs. The received data is then routed out of the multiplexer to the terminals.

FIGS. 3 to 6 illustrate details of the central processer 46 as well as the line interfaces 38 and 40 and the time base 41. These logic diagrams show processing of low speed data before it is assembled into the high speed digital stream.

Figures 7, 8, 9, 10, 11, 12, 13, 14, 15, 16, 17, 18, 19:
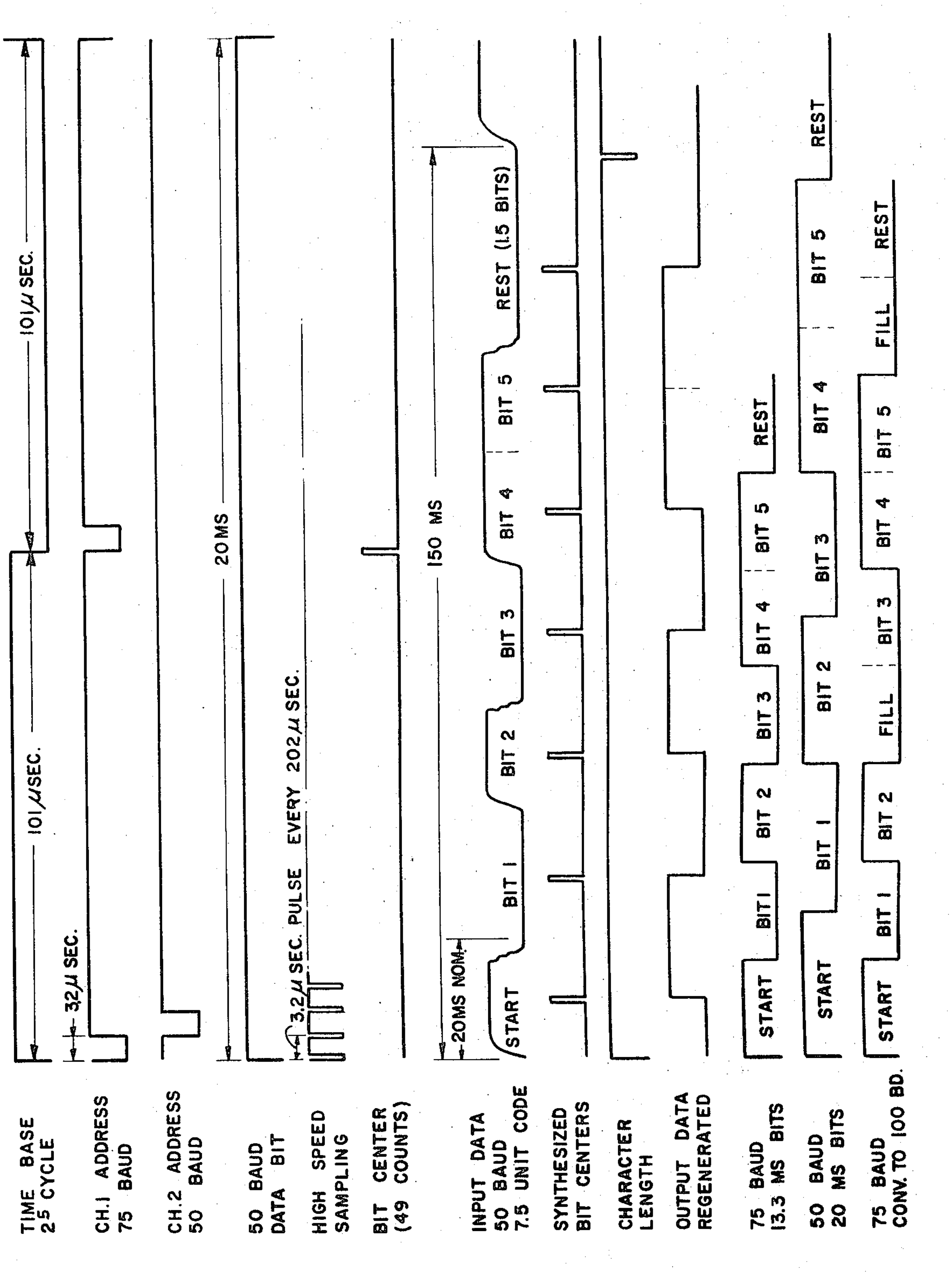
FIGS. 7 to 27 and 29 to 42 are time voltage diagrams illustrating the conditions relating to various portions of the multiplexer in FIGS. 1 to 6 and 28.

Within the time base 41 the source of timing for the time division multiplex is a crystal oscillator 70 operating at 4.9152 MHz. A counter 72 divides the frequency by four to provide various strobe signals. The frequency is further divided by four by a counter 74 for additional high speed clock signals. The output of the counter 74 at 307.2 KHz drives an address counter 76. The latter is a binary divider of 64 foreshortened by two counts to 62. The addres counter 76 has six outputs labelled $2^0$, $2^1$, $2^2$, $2^3$, $2^4$, and $2^5$. The output $2^5$ is illustrated in FIG. 7.

These six lines are then passed to address gates G6 in the line interfaces 38 and 40. Each of the gates G6 is a NAND gate having six inputs. Each input is connected to one of the lines from the address counter 76 or its inverse. This is shown by the inverters I. Whether the input to the gates G6 is connected to its line or its inverse determines the particular count that it decodes.

The NAND gates G6 thus provide a unique address for each low speed channel. This unique address is a pulse which is 3.2 microseconds in duration repeating every 202 microseconds for the interface 38 as shown in FIG. 8.

The gate G6 of interface 40 is not connected due to the $2^5$ line. Thus, it recycles every 101 microseconds. It produces a unique address for the channel asociated with the interface 40 which is 3.2 microseconds in duration. This is shown in FIG. 9.

A gate G5 applies the address in each interface to strobe the input data at the gate G3 onto the input data bus 43. At the same time, a marker is passed through gate G4 onto a class of traffic bus CTB. This marker goes into coding cards in the synthesizer 42 and bit counter 44 of FIGS. 4 and 5.

Input data which has now been placed on the input data bus 43 enters the registers 48 for regeneration and also routes to the synthesizer 42.

Figure 4:
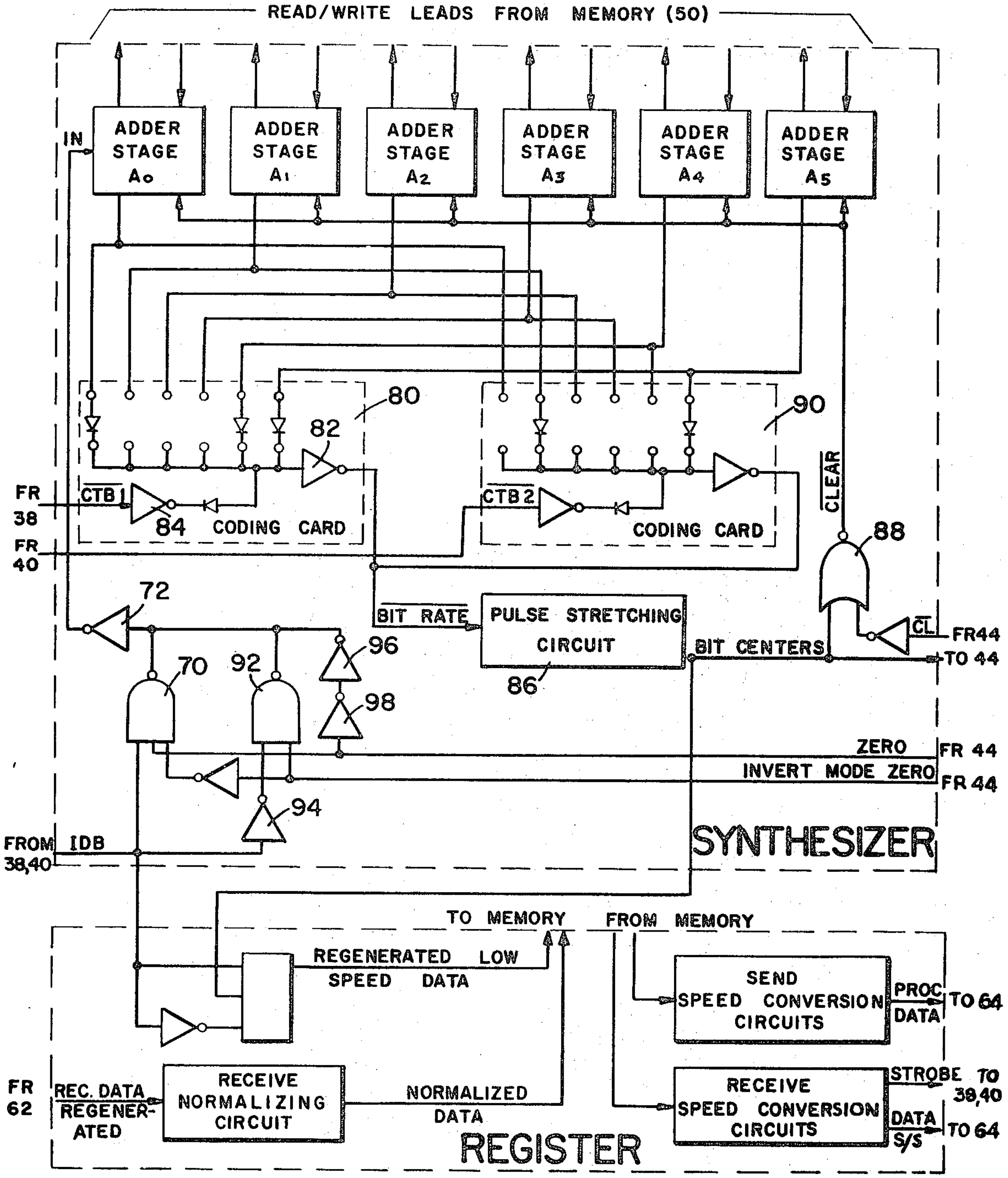
FIGS. 4 to 6 are partially block and partially logic diagrams of portions of the multiplexer in FIG. 2, and including the central processer unit of the multiplexer.

In the synthesizer 42, illustrated in detail in FIG. 4, the signals on the input data bus pass through a gate 70 which is held on except under circumstances to be described. The signal is applied sequentially through six adder stages A0 through A5 through a gate 72. The input to the adder stage A0 unlatches the adder stages. These stages are allowed the count every time a particular channel's address comes up. Hence, each 202 microseconds this counter is advanced starting from the transition at the leading edge of a bit. If the data is 50 bits per second, for examle, then each bit is nominally 20 milliseconds wide. The synthesizer is programmed to count be this particular bit a total of 49 counts of 202 microseconds each for a total of approximately 10 milliseconds. If a bit center is generated at this time it should be at the theoretical center of the incoming bit. The number of counts which the synthesizer is allowed to count up to is controlled by a coding circuit 80. Depending upon which diodes are connected in the coding circuit, any binary count representing any number of high speed samples can be decoded. When the proper count is reached all inuts to a gate 82 will gate high. This in conjunction with a high signal from a class of traffic gate 84 allows the output of gate 82 to go to ground, thereby generating a signal called "bit rate." A pulse stretching circuit 86 generates the signal called "bit center" and subsequently clears out the stages through a gate 88. The formation of a bit center is shown in FIGS. 10, 11 and 12. FIG. 10 represents a typical 50 baud bit, 20 milliseconds long. FIG. 11 shows the repetitive sampling every 202 microseconds. FIG. 12 shows the bit center generated after 49 cycles, or increments, of the high speed address.

The adder stages use the memory 50 to store the count for each channel. The memory reads out to each of the stages every 3.2 microseconds, corresponding to the slot intervals. Thus, each stage allows itself to be placed in the position to be advanced once every 3.2 microseconds.

A second coding circuit 90 is programmed by means of diodes to count to 34 so that it will generate a bit center every 6.8 milliseconds, the approximate center of a 75 baud (13.3 ms) bit. A class of traffic bus CTB2 enables the coding circuit 90 to generate the bit center only during time slots allocated to 75 baud.

The class of traffic buses CTB 1 and CTB 2 make it unnecessary to have a separate coding card for each line interface. Each class of traffic bus CTB 1 and CTB 2 carries the addresses of line interfaces operating at similar bit rates, character lengths, and other characteristics. In this manner the number of coding cards can be conveniently reduced to up to six for more than 40 channels. This allows the multiplexer to simultaneously process six different classes of traffic.

In the synthesizer 42 the gates 92 and 94 form an alternate path for the signals on the input data bus 43 when the bit counter 44 sets the synthesizer 42 into an invert mode. The gates 96 and 98 unlatch the outer stages after they receive their input. The invert mode function is described later.

The bit center signal emerging from the pulse stretching circuit 86, in addition to regenerating the data on the register is routed to the bit counter 44. Here a similar process takes place. The purpose of the bit counter is to count the number of bits in a character in order to tell where a character ends and a new character begins. Each low speed character is composed normally of seven bits if it is a standard or character.

In order to mix the 50 and 75 baud, it is necessary that the 75 baud be converted upwards to look like 100 baud, or two 50 baud channels. This is accomplished in the bit counter.

Figure 5:
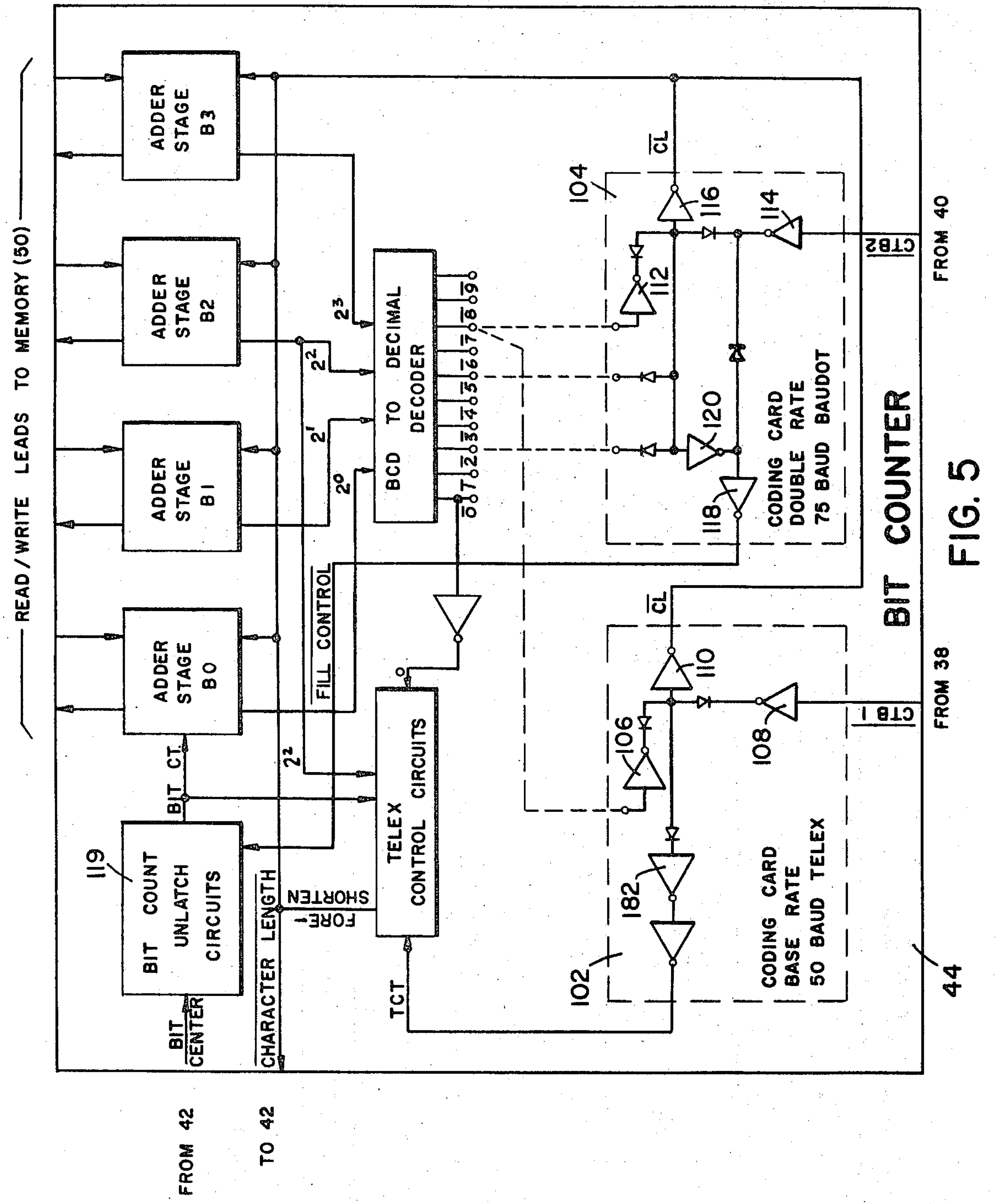

The bit counter contains four binary adder stages B0, B1, B2, and B3, and these stages are advanced by bit centers. A binary-coded-decimal to decimal decoder 100 monitors the state of this counter. A plurality of coding circuits, of which two coding circuits 102 and 104 are shown in FIG. 5 cooperate with the decoder 100. The decoder circuit 102 serves the normal 50 baud channel and is designated the base coding card. For such a Baudot character the output count of 7 is strapped into the coding circuit 102. When this count is reached, the signal through a gate 106, in conjunction with the class of traffic gate 108 allows the input to a gate 110 to go high and its output to go low. This output is a signal called "character length," and is a pulse once per character. This pulse, in turn clears out the bit counter and allows it to start counting again for the next character. In order for the bit counter to start counting the count unlatch circuit monitors bit centers, the state of the input data, and the count of 0 from the decoder. The beginning of a new character is detected by the fact that the decoder is on 0, thereby indicating that the last character has cleared the counter, and also by the fact that the state of the input data is a start polarity.

FIG. 13 shows a typical unregenerated Baudot character. FIG. 14 shows the seven bit centers generated by the synthesizer. FIG. 15 shows the character length signal generated by the bit counter, and FIG. 16 shows the Baudot character after completion of the regeneration process.

The coding circuit 104 includes gates 112, 114 and 116 which correspond to gates 106, 108 and 110. However, it includes two additional inputs from the decoder 100. These generate a signal called "fill control" which passes out through gates 118 and 120. This results in a pulse after the second and fifth bits of each 75 baud character. It will be noted that the input to the coding circuit 104 from the decoder 100 emerges from the outputs 2 and 5 of the decoder. These pulses, coming after the second and fifth bits of each 75 baud character are gated into a bit count unlatch circuit 118 which corresponds to the gates 70,92, 94, 96, and 98 of the synthesizer. The pulses result in "dummy" pulses being added to the bit stream. As shown in FIGS. 17, 18 and 19, a fill bit has been added after the second and fifth bits of the 75 baud character.

As one can see from this logic description, various fill pulses can be easily added to the bit stream in order to create a double rate channel.

The receive portion of this process is a mirror image of the send side. The fill pulses are automatically deleted in the register circuit and the output data is thus speed converted downward to 75 baud.

Figure 6:
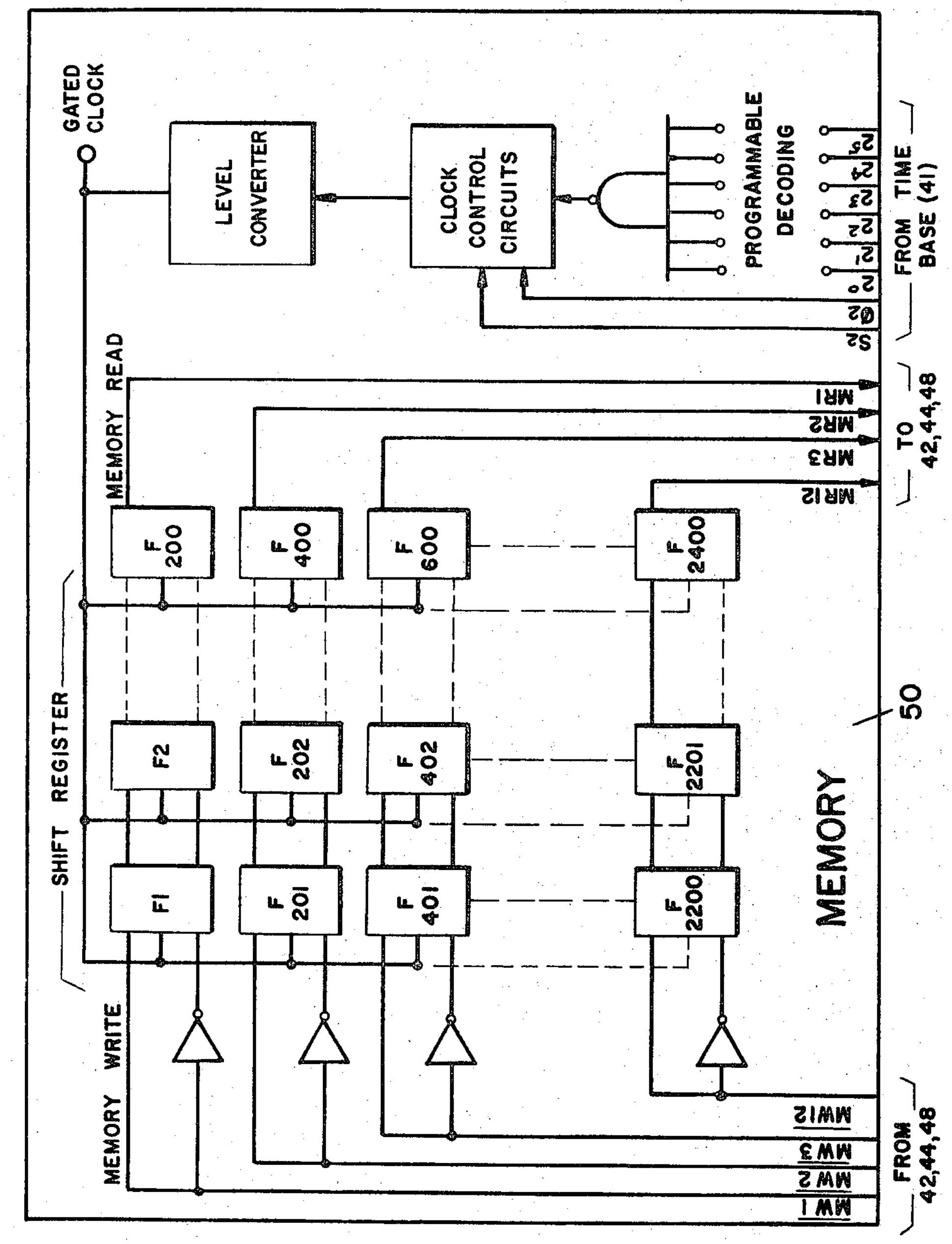

The processer unit 46 utilizes a central memory 50 shown in FIG. 6. This memory allows economical storge of information concerning all of the low speed channels. The memory is advanced at a rate of 1.2288 MHz. Gating circuits are included to ensure that a particular channel's data is available for access at the output of the registers during the time slot for the channel. The registers include flip flops F1, F201, F401 and .....F1001. As the memory is advanced, new information is written into the registers via flip flops F1, F201, F401, and F1001. As each address comes up the adder stages in the synthesizer and bit counter evaluate the information read out of the memory, advance the count by one and place new information onto the write leads of the memory. In this manner the information for every low speed channel is updated every 202 microseconds.

The theoretical center of a low speed data signal of any speed can easily be synthesized simply by programming the coding cards for any desired number of high speed samples. If the data bits, for example, are 9 milliseconds wide, one would simply program 4.5 milliseconds divided by 202 microseconds or a count of 23. Hence, when the synthesizer reaches the count of 23 it can generate a bit center which will be very close to the theoretical center of the bit. Similarly, the bit counter can accommodate any character length varying from one to nine as shown. According to other embodiments of the invention, additional decoding gates (not shown) allow character lengths to vary up to 12 bits long.

The multiplexers 22 and 30 also suitable for utilizing Telex signals. Before considering the circuitry involving the telex signals the procedure for establishing a call is discussed.

The procedure for establishing a call via the international Telex network is coordinated on a world-wide basis by the International Telegraph and Telephone Consultative Committee (C.C.I.T.T.) Their document relating to Telex is known as the White Book, Volume VII, Telegraph Technique, published by the International Telecommunications Union, 1969. Of particular significance are the "Series U Recommendations," beginning with Recommendation U.1, "Signalling Conditions to be Applied to the International Telex Service."

A brief summary of the Telex calling sequence is shown pictorially in FIGS. 20 to 27. The two types of selection commonly used are keyboard (Baudot Characters) and rotary dial (standard dial digits). The following is a brief description of the Telex signalling sequence for Keyboard (Type A) selection:

The circuit may operate in two polarities, start and stop. Initially, both legs of the circuit are in the FREE Line condition, or start polarity. The Calling Party initiates a call by going to Stop polarity at 138. Within 150 milliseconds of receipt of this change of state, the called party changes from Start to Stop as shown at 140 in FIG. 20. This transition begins the CALL CONFIRMATION 142, which lasts at least 100 milliseconds. At the end of this period,, the Called Party (FIG. 20) goes to Stop polarity for 40 ± 8 milliseconds. This pulse 144, (which is optional) is known as PROCEED TO SELECT. After this point keyboard characters are sent for several seconds to give selection information. During this time, the Called Party remains in Stop polarity. Upon completion of selection digits, the CALL CONNECTED signal 146 is returned to the Calling Party. This pulse is 150 ± 11 milliseconds of Stop polarity. After a period 148 of 2–8 seconds both legs are now in Stop polarity and this is considered to be the IDLE or Message state. Data can now be sent by either party. To terminate the call, a CLEARING SIGNAL 150 is sent. This is 300 milliseconds to one second of Stop Polarity. Upon receipt of the CLEARING SIGNAL, the other party responds with a CLEAR CONFIRMATION, which is simply a return to Stop polarity. This takes place between 350 ms and 1.5 seconds after receipt of the CLEARING SIGNALS. At this time both legs are in the FREE LINE condition and the call is completed.

Figures 20, 21, 22, 23, 24, 25, 26, 27:
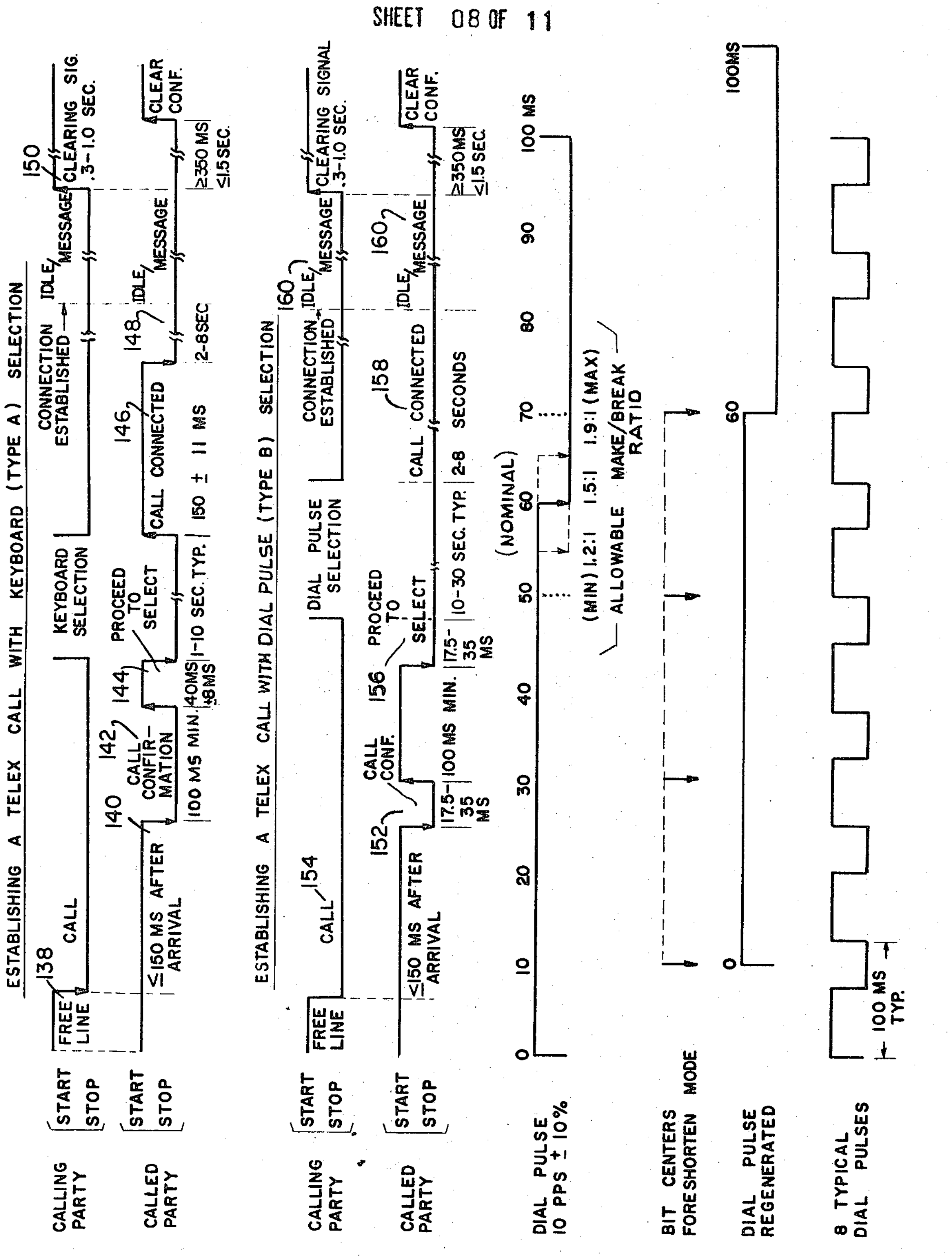

Dial Pulse (Type B) selection is similar, and occurs as follows as illustrated in FIGS. 22 and 23:

The CALL CONFIRMATION signal 152 is returned by the Called Party, as before, within 150 ms of receipt of the CALL signal 154. This pulse is much narrower than in Type A signalling, namely 17.5 – 35 milliseconds of Stop polarity. This is followed by at least 100 ms of Start and, optionally, a PROCEED TO SELECT pulse 156. This pulse is also 17.5 – 35 ms Stop polarity after which selection information may now be transmitted. In this case selection is via a rotary dial with approximately 12 digits being sent. Upon completion of dialing the CALL CONNECTED signal 158 is returned, and this consists of 2–8 seconds of Stop. At this point the connection is established and the circuit is in the IDLE/MESSAGE state 160. Clearing, upon completion of the call, is identical with Type A operation described above.

FIG. 23 illustrates a detail of the signal originating from a rotary dial. Note that there is a wide allowable tolerance on the MAKE/BREAK ratio, from 50/50 to 70/30 weighting. These pulses can occur at 100 milli-second intervals as opposed to baudot characters which are typically 150 milli-seconds long. The keyboard characters typically have 20 milli-second bits, hence bit centers are 20 milli-seconds apart during the regeneration process. Several pulses shown in FIGS. 20–23 can be as short as 17.5 milliseconds. One can see that a pulse this narrow could be lost if sampling occurs every 20 milliseconds.

FIGS. 25, 26, and 27 show synthesized bit centers, a regenerated dial pulse and a chain of typical dial pulses.

One can also see that passing dial pulses thru a system configured to regenerate Baudot 7 unit, 150 milli-second characters, can present problems.

Figure 28:
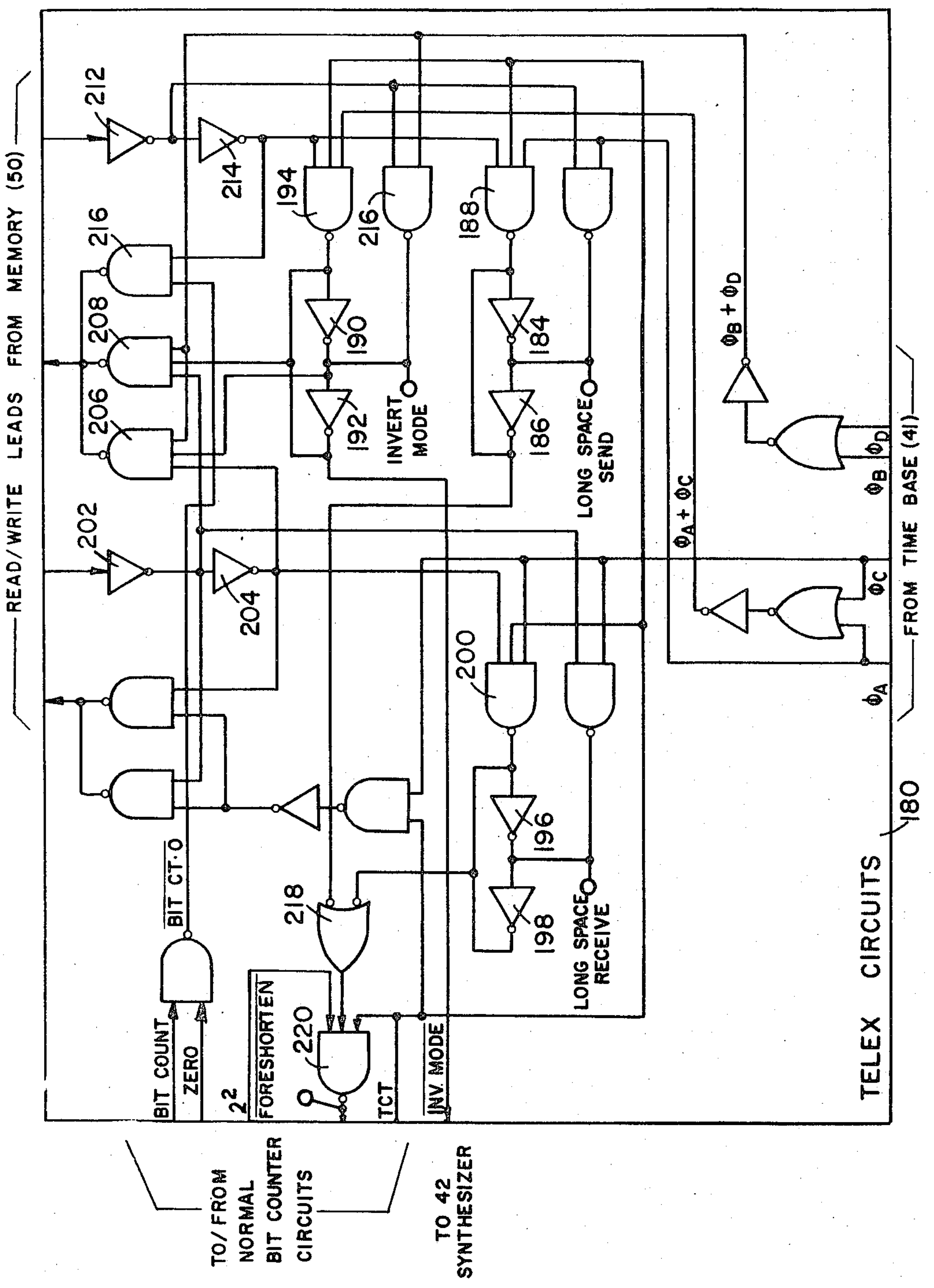
FIG. 28 is a logic diagram of Telex control circuits in the multiplexer in FIGS. 1–6.

The bit counter 44 includes a Telex control circuit 180 for rendering the system compatible to Telex signals. Details of the circuit 180 appears in FIG. 28. There are two main functions involved in passing Telex signals through the multiplexer. First is the processing of pulses more narrow than the normal 50 baud bits. Normal bits are 20 milliseconds long. CALL CONFIRMATION and PROCEED TO SELECT signals may be as narrow as 17.5 milliseconds as shown in FIGS. 19 to 22. If bit centers are randomly generated every 20 milliseconds, it is entirely possible to miss a narow signalling pulse. This is totally unacceptable for any transmission system. The circuit 180 detects these narrow pulses and regenerates them. It not only passes them but restores their lengths to normal limits.

The circuit 180 receives its input through a gate 182 in the base rate coding circuit 102 of the bit counter 44. The gate 182 may be either part of the circuit 102 or the circuit 180. Suitable diodes isolate the gate 182 from the remaining circuits. The output of the gate 182 is identified as the Telex class of trafic. This line TCT goes high for any channel that indicates it is a Telex channel. The line enables three functions, namely, long space send, long space receive, and invert mode. To enable the long space send function the line TCT enables a flip flop composed of gates 184 and 186 through a gate 188. It also sets a flip flop composed of gates 190 and 192 through a gate 194. To enable the long space receive mode a line TCT enables a flip flop composed of gates 196 and 198 through a gate 200. The circuit 180 receives the data input from the regenerated data that has been stored in the memory by the register 48 prior to its being transmitted by the send speed conversion circuits. This data is inverted twice by two gates 202 and 204. A switch composed of gates 206 and 208 selects the sense of the data appearing at the output of gate 202 or the output of gate 204 and writes it in a shift register 210 in the memory 50. The output of the memory shift register is inverted twice by two gates 212 and 214. If the output of the gate 214 is high, indicating a space, this output, in conjunction with a high on the line TCT sets the invert-mode flip flop composed of gates 190 and 192 to the invert mode. In this manner it controls the switch composed of gates 206 and 208 so as to store the data regenerated by the register in an inverted sense.

Figure 29:
Figure 30:
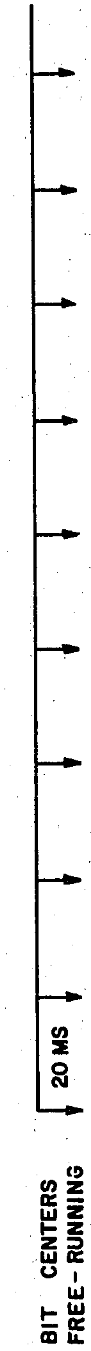
Figure 31:
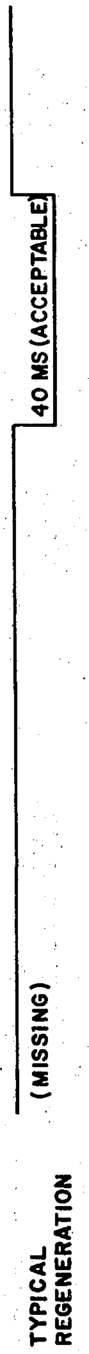

The invert mode function is necessary in the multiplexer in order to transmit Telex signalling pulses which are of shorter duration than normal 20 millisecond bits of data. The reason for this is that in the steady space mode the synthesizer is in a free running condition, that is, it is generating bit centers every 20 milliseconds without regard to any data bits. The problem arises when a bit of shorter duration than 20 milliseconds appears at the input to the multiplexer. If this pulse which can be as narrow as 17.5 milliseconds happens to fall between two 20 millisecond samples it will not be transmitted. These signals are shown in FIGS. 29, 30 and FIG. 31 shows that this pulse will indeed be lost in transmission. By use of the invert mode function when a steady space is detected on the data lead, the synthesizer is latched and in essence fooled by the signal so that it will unlatch a space to mark transition rather than a normal mark to space transition. In this manner, as long as the incoming pulse exceeds 10 milliseconds, it will be properly transmitted since 10 milliseconds after the space to mark transition the first bit center will be generated. At that point a 20 millisecond pulse will be transmitted and any pulse which is 17.5 milliseconds wide will be transmitted as a 20 millisecond pulse. This appears in FIGS. 32 and 33.

Figure 37:
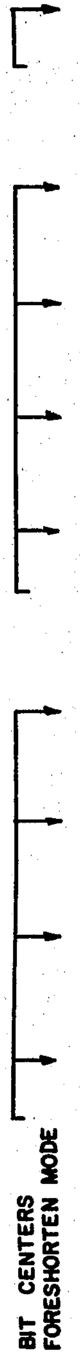
Figure 38:
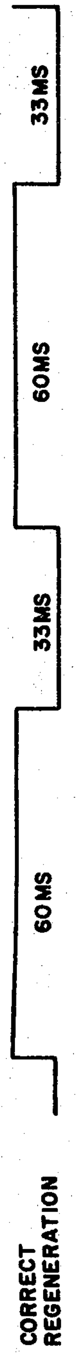

The long space send is stored in the DC flip flop composed of gates 184 and 186 after monitoring send data from gates 212 and 214. Similarly, long space receive is stored in the DC flip flop composed of gates 196 and 198. If it is determined that a particular path is in space, the invert mode function operates on that path. Ordinarily, the bit centers in the synthesizer would "free run" with steady space (start polarity), thereby generating a sampling pulse every 20 milliseconds. This is shown in FIG. 30, with FIG. 29 illustrating a narrow call confirmation pulse. In the invert mode the synthesizer input circuit is reconfigured with gates 92 through 98 (see FIG. 4) to keep the synthesizer locked in space and to unlatch on mark instead. This means that no sampling pulses are generated until there is a space-to-mark transition. At that instance the synthesizer unlatches and 10 milliseconds later generates its first sampling pulse or bit center as shown in FIG. 37. As shown in FIG. 38, this correctly retimes the pulse which would ordinarily have been lost and transmits it as a 20 milli-second signal.

The send and receive portions of the bit counter work independently. If a particular direction remains in steady space, that leg or path is forced into the invert mode. When the send leg, for example, receives transitions indicating that it is no longer in steady space, the DC flip flop is cleared out by a gate 216 when the spacing condition is removed.

Figure 34:
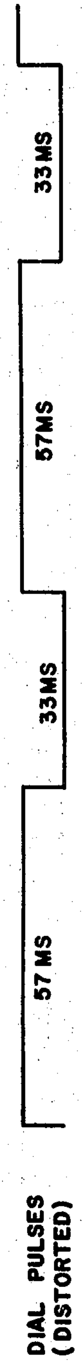
Figure 35:
Figure 36:
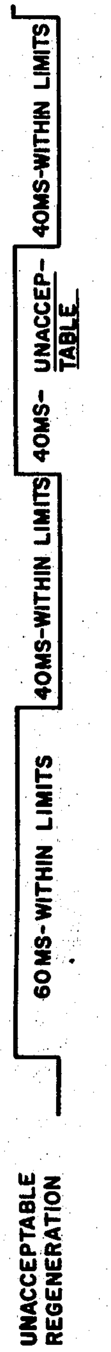

According to this embodiment of the invention dial pulses are passed through the multiplexer. FIGS. 34, 35, and 36 show what happens if dial pulses are treated as normal data. If the synthesizer unlatches for a dial pulse, it will most likely regenerate the first pulse correctly as shown. If a second dial pulse occurs when the regenerator thinks a normal character should be completed, one can see that an unacceptable pulse will result. This is overcome as shown in FIGS. 37 and 38.

Figure 32:
Figure 33:

If either path, send or receive, is in steady space, the multiplexer assumes a "foreshortened" mode. On the bit counter the outputs of the long space DC flip flop composed of gates 184 and 186 are applied to OR gate 218. The second input to the gate is the long space receive flip flop composed of gates 196 and 198. Thus, if either gate goes to ground, the output of gate 218 will go high. This output in conjunction with the line TCT and the bit count of $2^2$ causes the output of gate 220 to go to ground when all these conditions are met. This signal overrides the normal character length and curtails it to four bits instead of the normal seven for a Baudot character. FIG. 37 illustrates the bit centers as generated in the foreshortened mode. In this condition the synthesizer now unlatches at the beginning of a dial pulse and is allowed to generate four bit centers. This results in generation of the "Start" portion of a dial pulse which lasts approximately 60 milliseconds. The counters then latch waiting the start of another dial pulse. The circuit 180 forces the multiplexer into the foreshortened mode when either send or receive is in steady space. This is contrasted with the invert mode function which only inverts either the send or receive, which ever is in space. As shown in FIG. 32, the invert mode bit centers are in groups of four. This is because the system is in the foreshortened mode at that time.

The disclosed system passes dial pulses without going around the low speed portion of the multiplexer and without providing a separate character buffer for non-baudot signals. It avoids interweaving such an output with normal data in the aggregate. It avoids the disadvantages caused by bypassing, namely that no retiming or regeneration of the signals is accomplished. Thus, pulses which were marginal because of transmission deterioration and/or equipment tolerances, are prevented from being degraded below acceptable limits.

The elimination of separate character buffers for non-baudot signals avoids regeneration of signalling pulses with time delays. The character of the time delays can reach several hundred milliseconds, and such intolerable delay is overcome.

The disclosed device retimes the pulses to tolerances described by worldwide agreements on Telex. It corrects for transmission deterioration and timing variations, as well as other variables.

The disclosed system minimizes transmission delays because no additional storage or character assemblage is required. The types of delays, such as 30 to 40 milliseconds at each end are well within acceptable limits.

The disclosed multiplexer offers substantial increases in efficiency over present multiplexers.

Figures 39, 40, 41, 42:
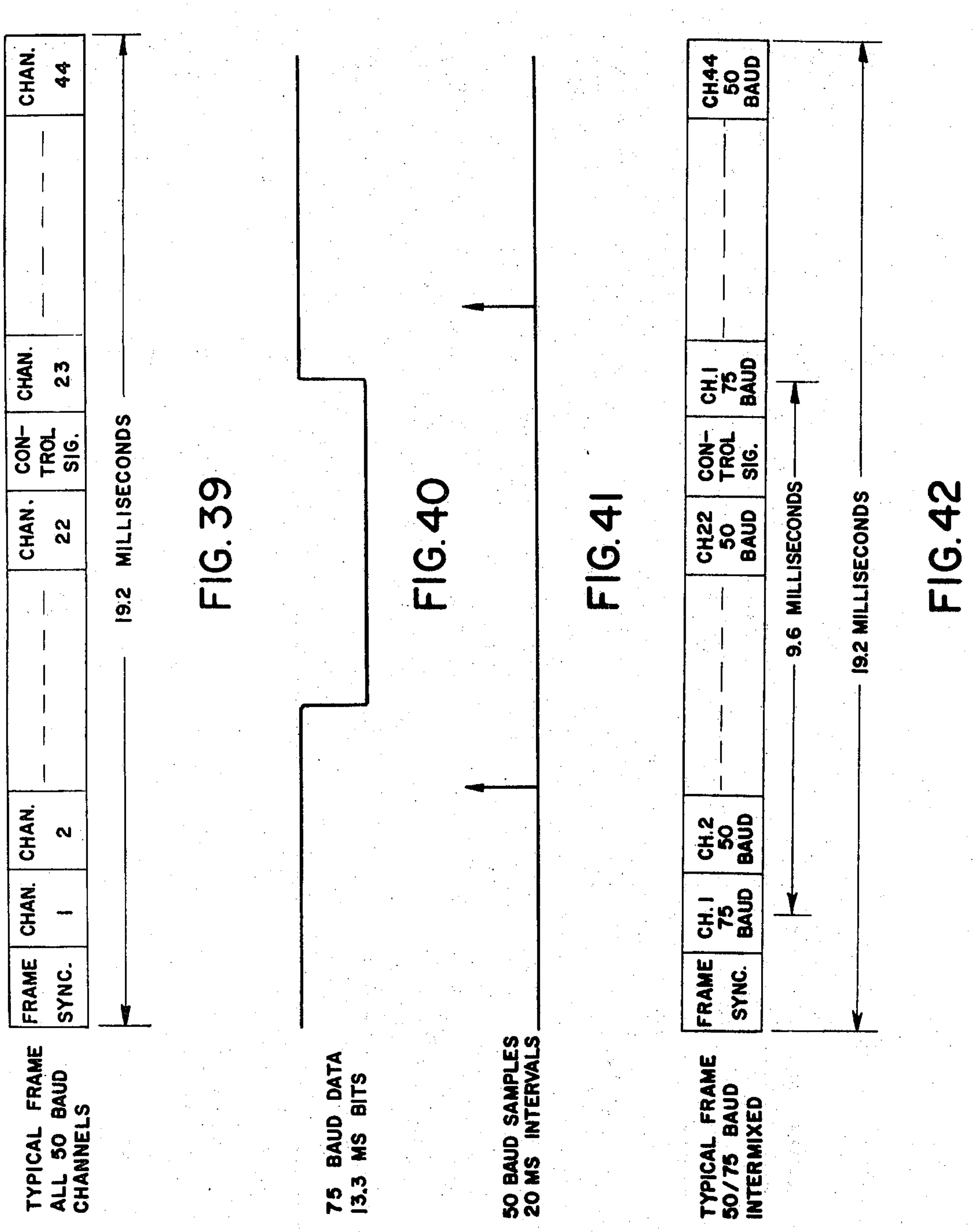

The efficiency of a TDM is generally defined as the maximum number of low speed subscribers possible for a given aggregate speed. For example, if the serial rate is 2400 band and subscribers are 50 baud, there are 2400/50 = 48 "slots" available. Allowing for frame synchronization, control signals and ability to accommodate terminals with speed error, one can typically multiplex 44 subscribers if all are 50 baud. Similarly, if 75 baud is the basic rate, 28 terminals can be accommodated. Assuming that we are speaking of bit-interleave multiplexers, a "frame" at 50 baud consists of 46 bits at 2400 baud, which takes 19.2 milliseconds. This means that during the nominal 20 millisecond bit period of a single low speed channel, we have sampled it plus all other subscribers, placed one bit from each onto the aggregate, and are ready to sample the next incoming bit. A frame for the 50 baud example would appear as shown in FIG. 39.

Similarly, a 75 baud frame takes 12.5 milliseconds, compared with a typical bit at 75 baud which is nominally 13.3 milliseconds long.

One can see that if a time division multiplexer (TDM) is configured for 50 baud, and 75 baud must also be accommodated, problems result. Sampling a channel every 19.2 milliseconds with a bit period of 13.3 milliseconds would appear as shown in FIGS. 40 and 41.

Obviously bits will be lost and hence will not be transmitted.

One suggested "cure" is to reconfigure the TDM as though all channels are carrying 75 baud. Bits will then be sampled every 12.5 milliseconds, which is adequate for 75 baud and does no harm for the slower 50 baud. (Fill pulses may be added to build them up to 75 baud.) Notice, however, that this 12.5 millisecond sampling period has been achieved by shortening the frame to 28 usable channels from the previous 44. With most multipliers this must be done even if only a single 75 baud channel is intermixed. This drastic reduction in efficiency is the handicap mentioned in *Modern Data*, Dec. 1971, p. 48.

The embodiment disclosed overcomes this handicap by accommodating higher speed subscribers with only a slight reduction in efficiency. This is accomplished by allowing a higher speed channel to occupy two equally spaced slots in the aggregate frame. For a 75 baud channel mixed with 50 baud the frame would appear as in FIG. 42.

In FIG. 42 a slot is available every 9.6 ms. to sample an incoming 75 baud bit (which can change every 13.3 ms.). This insures that no bits are lost, and fill pulses are inserted as required to speed convert the 75 baud to nominally 100 baud as shown.

The effeciency of the embodiment disclosed is apparent as shown above. When a single 75 baud channel is intermixed with 50 baud subscribers, throughput is reduced from 44 to 43 channels total. Other multiplexers would reduce their throughput from 44 to 28 channels, as previously described.

The relative efficiency is even more dramatic when mixing 50 baud with 200 band. Conventional multiplexers would have to shorten their frame to about 10 channels. The Databit 920 uses the scheme outlined above to allocate four slots evenly spaced in the aggregate frame. This allows the 5 millisecond pulses at 200 baud to be sampled every 19.2/4 = 4.8 milliseconds, which is adequate. Efficiency has dropped only from 44 to 41 channels, versus ten channels in the conventional TDM. In a similar manner, speed mixes of up to 16:1 can be accomodated in the time division multiplexer embodying the invention.

While embodiments of the invention have been described in detail, it will be obvious to those skilled in the art that the invention may be embodied otherwise without departing from its spirit and scope.

The line interfaces 38 and 40, the bit counter 44, the register 48, the synthesizer 42, and other components of the disclosed device are available as part of the Model 920 Multiplexer from Databit Incorporated of Hauppauge, N.Y.

What is claimed is:

1. A time division multiplexer for transmitting the content of bit streams of data appearing on one channel at one speed and another channel at another speed over a medium on a time-sharing basis; comprising sampling means for sampling each bit in each bit stream at a rate substantially higher than the bit streams so as to place all the bits on one line, selecting means for selecting one sample from each of the bits to regenerate the bits as sample streams, resampling means having a first portion for resampling the slower sample stream at a first rate equal to or greater than the slower sample stream and a second portion for resampling the faster sample stream at a rate which is an integral multiple of the first rate and equal to or faster than the speed of the faster sample stream, and means coupled to said resampling means for interleaving the sampled data.

2. The method of time division multiplexing the content of bit streams of data appearing on one channel at one speed and on another channel at another speed, over a medium on a time-sharing basis; which comprises sampling each bit in each bit stream at a rate substantially higher than the bit streams so as to place all the bits on one line, selecting one sample from each of the bits to regenerate the bits as sample streams and resampling the slower sample stream at a first rate equal to or greater than the slower sample stream and resampling the faster sample stream at a rate which is an integral multiple of the first rate and equal to or faster than the speed of the faster sample stream, for interleaving the sampled data.

* * * * *